(12) United States Patent
Masciulli

(10) Patent No.: US 6,844,841 B1
(45) Date of Patent: Jan. 18, 2005

(54) RADIO FREQUENCY LINK PERFORMANCE TOOL PROCESS AND SYSTEM

(75) Inventor: Michael Masciulli, East Brunswick, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/705,995

(22) Filed: Nov. 13, 2003

(51) Int. Cl.$^7$ .............................................. G01S 7/537
(52) U.S. Cl. .................... 342/13; 342/16; 342/165; 342/173; 342/175; 342/195; 342/450; 455/84; 375/130; 375/140; 375/146; 375/147; 375/219; 375/295; 375/316
(58) Field of Search ........................ 342/1–20, 165–175, 342/189–197, 450–465; 375/130–153, 219, 295, 316; 455/84–87, 73

(56) References Cited

U.S. PATENT DOCUMENTS

| | | | |
|---|---|---|---|
| 5,323,161 A | * | 6/1994 | Gailer et al. .................. 342/13 |
| 5,363,103 A | * | 11/1994 | Inkol ........................... 342/13 |
| 5,381,150 A | * | 1/1995 | Hawkins et al. ............... 342/13 |
| 5,854,601 A | * | 12/1998 | Kenefic ........................ 342/13 |
| 6,043,770 A | * | 3/2000 | Garcia et al. .................. 342/13 |
| 6,232,909 B1 | * | 5/2001 | Masciulli ..................... 342/13 |

* cited by examiner

Primary Examiner—Bernarr E. Gregory
(74) Attorney, Agent, or Firm—Edward L. Stolarun

(57) ABSTRACT

A system and method for optimizing transmission of radio frequency communication link signals in a radio frequency communications network comprises determining a statistical difference between a mean radio frequency communication link propagation loss value based on a set of measured radio frequency communication link propagation loss values, and a radio frequency communication link propagation loss model value; calculating a signal to noise ratio of a radio frequency communication link signal; computing a confidence interval based on a measured signal to noise threshold ratio of a measured radio frequency communication link signal, and a standard deviation associated with the calculated signal to noise ratio; assigning a probability value based on the confidence interval; and generating a radio frequency communication link packet completion rate performance level based on the probability value. The transmission of radio frequency communication link signals occurs in either jamming or no jamming situations.

27 Claims, 4 Drawing Sheets

RADIO FREQUENCY LINK PERFORMANCE TOOL PROCESS AND SYSTEM

GOVERNMENT INTEREST

The invention described herein may be manufactured, used, and/or licensed by or for the United States Government.

BACKGROUND OF THE INVENTION

1. Field of the Invention

The present invention generally relates to digital radio frequency (RF) links, and more particularly to a radio frequency link performance tool (RFLPT) process and system, which predicts the successful transmission of digital packets over an RF link with RF interference, such as jamming or Electronic Warfare (EW) effects, and without an intentional interference (non-jamming) environment.

2. Description of the Related Art

A method for optimizing an RF communications network for use in a battlefield environment is described in U.S. Pat. No. 6,232,909 issued to Masciulli, the complete disclosure of which is herein incorporated by reference (hereinafter referred to as "the '909 patent"). The '909 patent describes a process for determining the performance of radio frequency links in the United States Army's Enhanced Position Location Reporting System (EPLRS) with a high level of statistical confidence. The method described therein includes determining a statistical difference between a mean propagation loss for an EPLRS RF link based on measured RF propagation loss and Terrain-Integrated Rough-Earth Model (TIREM) calculated RF propagation loss, establishing a margin of error based on the statistical difference to arrive at a confidence level of the RF propagation loss, determining a computed signal to noise ratio (S/N) based on the confidence level, for the benign and jamming case, and determining a Probability of Communication (PCOM) value based on the computed S/N value.

EPLRS is an integrated communications system that provides near real-time data communications, such as global positioning communications including position/location, navigation, identification, and reporting information on the modern battlefield. The system, which may include 300–1500 terminals in a division with up to five Network Control Stations (NCS), utilizes spread spectrum technology and frequency hopping error detection and correction and is capable of supporting multiple communication channel operations. Understanding RF link performance is critical to the effective use of EPLRS. RF link performance is broadly characterized by the ratio of desired EPLRS received signal to noise within the communication channel (the SIN ratio).

Conventional systems and methods utilizing the EPLRS capacity model simulations use various parameters to characterize the desired signals, propagation characteristics, communication, and battlefield scenarios. While the signal models work quite well under a number of scenarios, the nature of the problem is such that the models are unable to account for many situations that can and do occur on the battlefield. As such, the method described in the '909 patent uses statistical methods to account for the variability associated with certain parameters used to compute the EPLRS RF link performance. In the case of a communications system such as EPLRS, the RF noise background and RF propagation loss are two parameters that are difficult to model with great accuracy. Thus, statistical methods can provide a quantitative level of confidence, based on measured data and certain numerical assumptions.

According to the method taught in the '909 patent, the key parameter used to measure a single EPLRS RF link performance is the PCOM which is a function of S/N. PCOM is the probability of a single EPLRS pulse being successfully received over a single link in one direction. The EPLRS system employs four modes of operation, which provide various levels of anti-jamming capability. These algorithms provide a PCOM for each EPLRS RF link based on the mode of operation and random Gaussian (white) noise in the RF noise environment.

The EPLRS PCOM analysis tool can provide a user with a quantitative level of confidence for predicting EPLRS RF link performance. Currently, the U.S. Army uses a model called the Terrain-Integrated Rough-Earth Model (TIREM) to calculate a mean RF propagation loss value given a terrain profile along the RF link path. For general background, see DOD Electromagnetic Compatibility Analysis Center (ECAC) document ECAC-HDBK-93-076, entitled "TIREM/SEM Handbook" dated March, 1994, chapter 5 "Model Limitations," page 5—5, the complete disclosure of which is herein incorporated by reference. According to the TIREM/SEM Handbook, TIREM's mean calculated RF propagation loss is –0.6 dB with a standard deviation of 10.5 dB. However, TIREM is static and does not adequately account for changes in RF signal and noise conditions, resulting in the miscalculation of RF link propagation losses.

While one could attempt to refine the model in order to account for various propagation conditions, the possible combinations are simply too numerous. Rather than attempting to improve the model, the process described in the '909 patent performs a statistical analysis of all the model parameters required to calculate the EPLRS S/N ratio, then identifies the parameters that have the most inaccuracies, making those parameters the limiting factor during subsequent calculations. For example, the method in the '909 patent accounts for the inaccuracy contained in the TIREM mean value, by using a process that provides a margin based on random variables and the normal distribution function. This margin provides a stressing factor to the mean calculation of S/N, which allows for a higher confidence that the model will represent the real world by a certain percentage of time.

Another example is the RF noise background used for the noise calculation, which is separate from the broadband jamming noise. Reference is made to ITT textbook entitled "Reference Data For Radio Engineers" fifth edition (October, 1968) page 27-2 FIG. 1 "Median Values of Average Noise Power from Various Sources," the complete disclosure of which is herein incorporated by reference. These values are assumed values that can be used as stress factors when calculating the N in the S/N ratio.

Although the '909 patent provides the U.S. Army's EPLRS as the RF link, there is a need to include all digital packet structures transmitted over RF links. Moreover, the conventional models use TIREM to calculate a mean RF propagation loss value given a terrain profile along the RF link path. However, the S/N value calculated from the TIREM's nominal propagation loss value does not account for the standard deviation associated with the TIREM calculated propagation loss and actual measured values of propagation loss. Therefore, there remains a need for improvements to the conventional techniques.

SUMMARY OF INVENTION

In view of the foregoing, an embodiment of the invention provides a method and program storage device performing a method for optimizing transmission of radio frequency communication link signals in a radio frequency communications network comprising determining a statistical difference between a mean radio frequency communication link propagation loss value based on a set of measured radio frequency communication link propagation loss values, and a radio frequency communication link propagation loss model value; calculating a signal to noise ratio of a radio frequency communication link signal; computing a confidence interval based on a measured signal to noise threshold ratio of a measured radio frequency communication link signal, and a standard deviation associated with the calculated signal to noise ratio; assigning a probability value based on the confidence interval; and generating a radio frequency communication link packet completion rate performance level based on the probability value. The transmission of radio frequency communication link signals occurs in situations in which there is either jamming or no jamming of the frequency communications network.

The radio frequency communication link propagation loss model value is based on a Terrain-Integrated Rough-Earth Model. Moreover, the radio frequency communication link performance level comprises a probability of successfully receiving transmissions of digital packets in the radio frequency communications network; wherein the probability of successfully receiving transmissions of digital packets in the radio frequency communications network comprises packet completion rate measurements.

The radio frequency communication link signals are transmitted from a transmitter to a receiver in the radio frequency communications network, wherein in the step of calculating the signal to noise ratio, the signal value comprises a combination of the power of the transmitter, an antenna gain of the transmitter, a cable loss of the transmitter, a propagation loss value from the transmitter to the receiver, an antenna gain of the receiver, and a cable loss of the receiver. Additionally, in the step of calculating the signal to noise ratio, the noise value comprises a combination of the power of a jamming transmitter, an antenna gain of the jamming transmitter, a cable loss of the jamming transmitter, a propagation loss value from the jamming transmitter to the receiver, an antenna gain of the receiver, a cable loss of the receiver, and a jammer bandwidth correction factor.

Additionally, the invention provides a system for optimizing transmission of radio frequency communication link signals in a radio frequency communications network comprising means for determining a statistical difference between a mean radio frequency communication link propagation loss value based on a set of measured radio frequency communication link propagation loss values, and a radio frequency communication link propagation loss model value; means for calculating a signal to noise ratio of a radio frequency communication link signal; means for computing a confidence interval based on a measured signal to noise threshold ratio of a measured radio frequency communication link signal, and a standard deviation associated with the calculated signal to noise ratio; means for assigning a probability value based on the confidence interval; and means for generating a radio frequency communication link packet completion rate performance level based on the probability value. The transmission of radio frequency communication link signals occurs in situations in which there is either jamming or no jamming of the frequency communications network.

The RFLPT process of the invention has several potential uses including providing the Commander, Army Field Tester, or commercial radio designer a predicted outcome of RF Packet Completion Rates (PCR) prior to deploying an RF network. The PCR rate is defined as the ratio of successfully received packets divided by the total packets sent from a source host computer over a single RF link to a destination host computer. The deployment used by a network is provided by the Commander or Tester and does not restrict the network to a specific deployment but provides useful information on the link PCR outcome, based on a preferred deployment with and without jamming of the communications network. Additionally, the process provided by the invention can be used with any RF propagation loss model, which has a predetermined standard deviation value for the calculated model propagation loss value and the measured propagation loss value.

The invention's RFLPT process can also be used to design a jamming field test based on the direction of the jammer's antenna and its power levels as determined by the RFLPT. Moreover, the S/N threshold value, which is determined by the inventive procedures, can be used to improve radio designs. Additionally, Connectivity Confidence Interval (CCI) values, determined for each possible RF link used by a network, can be used to simulate PCRs, which are used in conventional U.S. Army RF communication models. In fact, the RFLPT process of the invention provides the trial size and the probability value required to simulate PCRs. As mentioned, the conventional models use the Terrain-Integrated Rough-Earth Model to calculate a mean RF propagation loss value given a terrain profile along the RF link path. However, the S/N value calculated from the TIREM's nominal propagation loss value does not account for the standard deviation associated with the TIREM calculated propagation loss and actual measured values of propagation loss. Conversely, the Connectivity Confidence Interval of the invention does account for the standard deviation of each link.

Furthermore, there are several problems, which the RFLPT process of the invention solves. For example, the inventive RFLPT process may be used to support EPLRS field jamming tests and provide an accurate prediction of PCRs prior to the test. In fact, this was confirmed after conducting a test using the invention with actual data. Moreover, the laboratory-measured PCR test provides a new method of testing, which does not require separate Bit Error Rate measurements (BER), which are used in conventional approaches. The BER measurements are more difficult to determine with packet structure radios. Rather the BER of the invention is a function of the PCR. The PCR value provides the end user a parameter, which directly correlates with the host computer's Message Completion Rate. The PCRs are defined as a statistical probability, but because this probability is limited to two decimals it also becomes a percentage value.

Also, the CCI value determined from the inventive RFLPT process provides an accurate prediction of PCRs over current U.S. Army RF communication methods, which may predict an incorrect outcome, and the inventive RFLPT process provides a method for quantifying the effects of jamming and non-jamming environments on digital packets or message traffic. Moreover, the invention assists in identifying potential design faults and errors in the technical documentation for U.S. Army radios. These findings may also help to improve future designs of U.S. Army radios and other communication devices.

The PCR test procedures above were initially demonstrated on the EPLRS radio. These procedures have also been used to perform EW susceptibility tests on other communication systems such as the Single Channel Ground Air Radio System (SINCGARS), Near Term Digital Radio (NTDR) and the High Capacity Light of Sight (HCLOS) Radio.

There are several advantages of the RFLPT process provided by the invention. For example, the inventive PCR test procedures allow testing of EW susceptibility test procedures. Moreover, the invention reduces the cost of paying contractors to use their test facilities to test new jamming waveforms, which also affects their productivity during production because of new procedures required to test new waveforms. Another advantage of the invention is that it reduces costs in paying contractors to develop test plans and traffic generators for the test, as existing traffic generators and existing commands may be used instead on the host computer. Furthermore, the trial size used in the PCR as provided by the invention, for determining the threshold S/N value, reduces testing time and provides a realistic percentage number based on the tolerances of laboratory test equipment. Also, test time is reduced because the trial experiment is based on successfully received packets and not the time to receive packets. In fact, over-testing is costly and does not improve the accuracy of the PCR value. Moreover, by not having to conduct a BER test and reducing the total messages (100 minimum) used in the PCR experiment, the invention reduces time and costs associated with laboratory tests and experiments.

Other advantages of the invention are that it identifies potential design faults and errors in the technical documentation provided to the U.S. Army. These findings also help to improve future designs of U.S. Army radios and other communication devices. Generally, the inventive RFLPT methodology provides a process, which currently does not exist and is used to design field-jamming tests, which are costly, and time consuming, especially if the desired outcome is not achieved and retesting is involved.

BRIEF DESCRIPTION OF THE DRAWINGS

The invention will be better understood from the following detailed description of the preferred embodiments of the invention with reference to the drawings, in which.

DETAILED DESCRIPTION OF PREFERRED EMBODIMENTS OF THE INVENTION

As previously mentioned, there is a need for an improved RFLPT process, which includes all digital packet structures transmitted over RF links and which overcomes the limitations of the conventional processes and systems. Referring now to the drawings, and more particularly to FIGS. 1 through 4, there are shown preferred embodiments of the invention.

Figure 1:
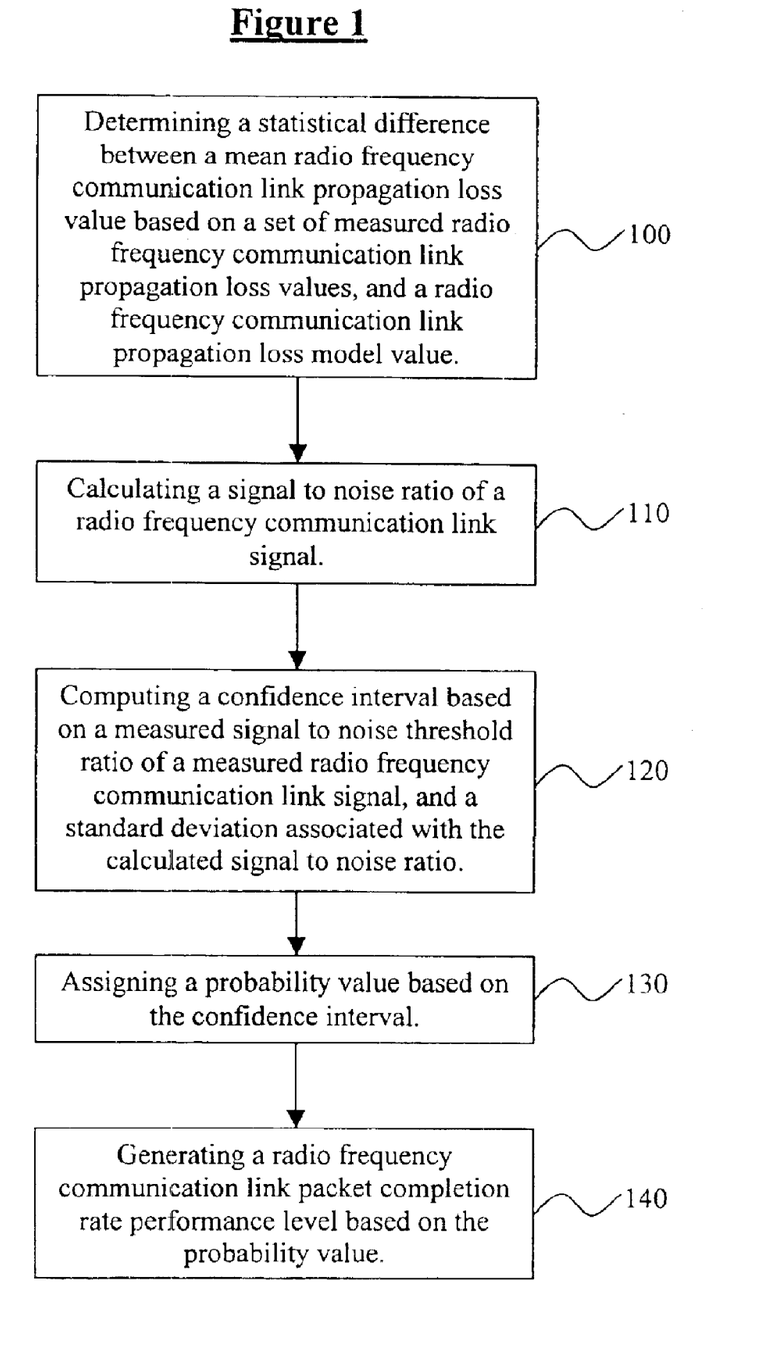
FIG. 1 is a flow diagram illustrating a preferred method of the invention.

According to FIG. 1, a method for optimizing transmission of radio frequency communication link signals in a radio frequency communications network comprises determining 100 a statistical difference between a mean radio frequency communication link propagation loss value based on a set of measured radio frequency communication link propagation loss values, and a radio frequency communication link propagation loss model value. The next step involves calculating 110 a signal to noise ratio of a radio frequency communication link signal. Upon completion of this step, the process involves computing 120 a confidence interval based on a measured signal to noise threshold ratio of a measured radio frequency communication link signal, and a standard deviation associated with the calculated signal to noise ratio. Next, the invention involves assigning 130 a probability value based on the confidence interval. Finally, the process includes the step of generating 140 a radio frequency communication link packet completion rate performance level based on the probability value. The transmission of radio frequency communication link signals occurs in situations in which there is either jamming or no jamming of the frequency communications network.

The radio frequency communication link propagation loss model value is based on a Terrain-Integrated Rough-Earth Model (TIREM). Moreover, the radio frequency communication link performance level comprises a probability of successfully receiving transmissions of digital packets in the radio frequency communications network; wherein the probability of successfully receiving transmissions of digital packets in the radio frequency communications network comprises packet completion rate measurements.

As previously mentioned, the RFLPT process is currently used by the U.S. Army to support an EW or jamming vulnerability analysis before and after field tests. The '909 patent describes the variability associated with the Terrain-Integrated Rough-Earth Model and how each calculation of the signal to noise ratio should have a confidence number associated with it.

In the process described in the '909 patent one uses a confidence interval for the S/N calculation of 50%, 60%, 70%, 80%, or 90%. This results in a calculated S/N in which a margin of error has been subtracted from the calculated value to give a new S/N value, which is used to compute the PCOM. For example, column 5, line 61 to column 6, line 14 in the '909 patent describes calculating the S/N using a 70% confidence interval. Thereafter, the PCOM versus S/N data is curve fitted into an equation. Moreover, the PCOM versus S/N data is based on the EPLRS contractor EW laboratory test results. However, the invention replaces this method with the procedures described below.

The invention uses specialized test procedures to determine a packet completion rate (PCR) value, which is the probability of a single EPLRS pulse being successfully received over a single link in one direction. The PCR value of the invention is determined by incorporating a specific number of experimental trials. The trial size for the PCR experiment uses the Wilkes equation to determine a sample size of 100, which is described in Duncan, "Quality Control and Industrial Statistics," page 142. This sample size provides approximately 91% assurance that 96% of the population will be represented by the experiment. When the experiment is conducted 100 EPLRS pulses are transmitted. Furthermore, the total number of successfully received pulses divided by 100 pulses sent generates the PCR value. Thus, the derived value is a percentage. One pulse represents one packet of digital information and that one packet represents one message from a host computer. These packets are sent in one direction and are not retransmitted when one is not received.

The PCR test procedures above were initially demonstrated on the EPLRS radio. These procedures were also successfully used to perform EW susceptibility tests on other communication devices, such as the Single Channel Ground Air Radio System (SINCGARS), Near Term Digital Radio (NTDR) and the High Capacity Light of Sight (HCLOS) Radio. Moreover, these test procedures also determine an RF link threshold for non-jamming cases as well. The Jamming Scenario:

According to the invention, the Connectivity Confidence Interval (CCI) value replaces the '909 patent choices for a confidence interval of 50%, 60%, 70%, 80% and 90%. Moreover, the CCI value for the jamming case is determined from the following equation:

$$Z=((S/N)\_T-(S/N)\_CAL)/SD\_(S/J))$$

The above Z value corresponds (is verified) with the Z number described in the probability table shown on page 945 of the Duncan text. The table in the Duncan text provides a Z number, which corresponds to a probability. This probability number represents the CCI, which is the probability that all measured values of S/N will be greater than or equal to the $(S/N)_{13}$ T threshold. As such, this measured threshold defines a point where the digital link has a good connectivity at or above the (S/N)_T value and a bad connectivity below this value, hence the term CCI.

More specifically, (S/N)_T is the threshold, which comes from the PCR experiment wherein this value of S/N results in a PCR of 0.80 (80%). (S/N)_CAL is the S/N, which is calculated by the RFLPT software, and uses the TIREM to calculate the propagation loss value for the received EPLRS signal and the received jammer signal. Moreover, the inventive process can be implemented in any computer software code such as in Dbase V for DOS. Moreover, those skilled in the art will readily understand implementing the inventive process in a variety of computer software codes.

The S value indicated above for the jamming situation is calculated by the following equation: S=Transmitter Power (in dBm before the antenna)+Transmitter Antenna Gain−Cable Losses (at the transmitter side)−Propagation Loss Value from the Transmitter to the Receiver+Receiver's Antenna Gain−Cable Losses (at the receiver side).

The J value is calculated by the following equation: J=Jammer's Power (in dBm before the antenna)+Jammer's antenna gain−Cable Losses (on the transmitter side)−Propagation Loss Value from the Jammer to the Receiver+Receiver's Antenna Gain−Cable Losses (on the receiver side)−Jammer bandwidth correction factor (based on the jammer's transmitted bandwidth and the receiver's bandwidth).

The N value indicated above for the jamming situation is calculated using the following equation:

$$N=10[\log(10^{(Ne/10)}+10^{(J/10)})]$$

The receiver's approximate noise environment (Ne) can be determined from any number of readily available reference texts. See, e.g., the "ITT's Reference Data For Radio Engineers," fifth edition, page 27-2, for rural, suburban, and urban noise environments. The J calculation in the receiver's band has the largest standard deviation (SD) because of the propagation loss. Therefore the SD of N is approximately equal to the SD of J. The Ne value can be changed based on the above-described environments to predict worst-case conditions.

The standard deviation associated with the RF link for the received EPLRS signal is abbreviated as SDS. Likewise, the standard deviation associated with the RF link for the received jammer signal is abbreviated as SD_J. The SD for the S/J is equal to the square root of $(SD\_S^2+SD_{13} J^2)$. This parameter is abbreviated as $SD_{13}$ (S/J). The current SD values depend on the following type of RF links defined in TIREM as:

Line-Of-Sight with no reflection, the SD=0 dB

Line-Of-Sight with reflection, the SD=8.6 dB

Diffraction, the SD=11.4 dB

Troposcatter, the SD=8.8 dB

This replaces the conventional approach described in the '909 patent where the SD=10.5. In an example of the current invention, an average value of 10.5 dB was used for all types of RF links calculated by TIREM. For both S and J, S/N SD is equal to the square root of $(10.5^2+10.5^2)=14.8$.

The Non-Jamming Scenario:

The CCI parameters for the non-jamming are described below. This CCI value is determined from the probability associated with the following equation:

$$Z=((S/N)\_T-(S/N)\_CAL)/SD\_S)$$

, where (S/N)_T is the threshold, which comes from the PCR experiment, wherein this value of S/N results in a PCR of 0.80 (80%). (S/N)_CAL is the S/N, which is calculated by the RFLPT software, which uses TIREM to calculate the propagation loss value for the received EPLRS signal.

The S value indicated above for the non-jamming situation is calculated by the following equation: S=Transmitter Power (in dBm before the antenna)+Transmitter Antenna Gain−Cable Losses (at the transmitter side)−Propagation Loss Value from the Transmitter to the Receiver+Receiver's Antenna Gain−Cable Losses (at the receiver side).

The N value indicated above for the non-jamming situation is equal to the Ne receiver's approximate noise environment, which can be determined from any number of readily available reference texts. See, e.g., the "ITT's Reference Data For Radio Engineers," fifth edition, page 27-2, for rural, suburban, and urban noise environments. SD_S is the standard deviation associated with the RF link for the received EPLRS signal only, since there is no jammer present.

Figure 2:
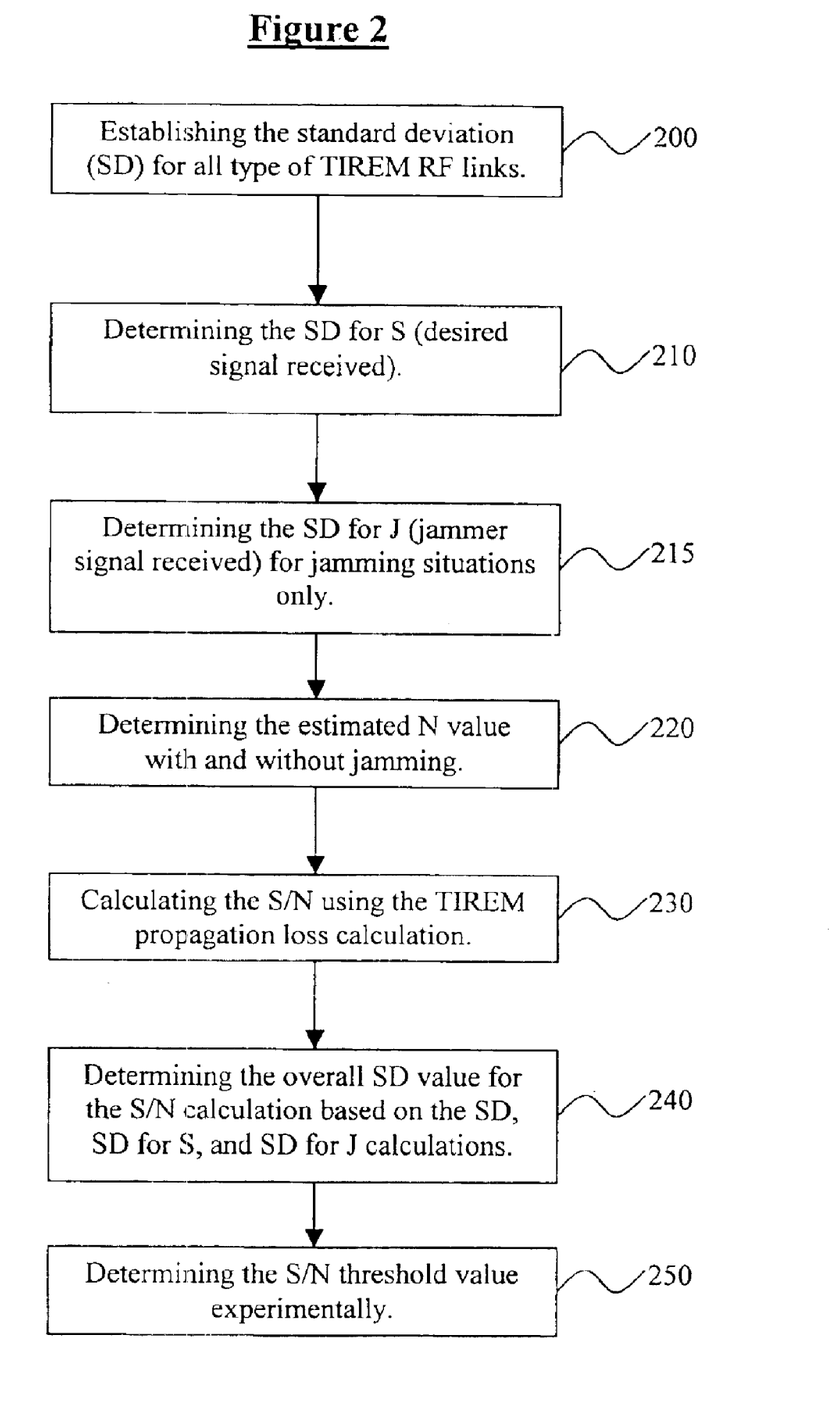
FIG. 2 is a flow diagram illustrating a preferred method of the invention.

In other words, using TIREM as an example, the process of determining the Connectivity Confidence Interval (CCI) is described as follows and further illustrated in the flow diagram of FIG. 2. The process begins by establishing 200 the standard deviation (SD) for all type of TIREM RF links. Next, the SD for S (desired signal received) is determined 210. This step is required for both the jamming and non-jamming case. Thereafter, the SD for J (jammer signal received) is determined 215, which is required for the jamming case only. The next step involves determining 220 the estimated N value with and without jamming. Upon completion of this step, the S/N is calculated 230 using the TIREM propagation loss calculation.

After this, the overall SD value for the S/N calculation is determined 240 based on the SD, SD for S, and SD for J calculations given above. Next, the S/N threshold value is determined 250 experimentally, using techniques described in determining the PCR value described above. Again, this experimental test is required for different types of jammers. As mentioned, the PCR for the S/N threshold value is preferably greater than or equal to 80%.

Thus, the CCI probability values are determined from the process described above. Again, the CCI probability value is used to predict the probability of a single RF packet being successfully received over a single link. Moreover, TIREM can be used to determine all possible combinations of RF links, which support a given network, and assign a CCI value for each of these links. Furthermore, if the TIREM propagation loss model is not used, then another propagation loss model known in the art may be used, whereby the SD values and calculations associated with the alternate propagation loss model and average measure propagation loss values can be used.

Additionally, the SD values referred to above can be adjusted for specific areas, based on propagation loss values measured in this RF environment, for the various types of links. According to the invention, the CCI approach for predicting PCR greatly improves simulations of large communication network models because the RF packet is the fundamental component behind host messages traffic and RF protocols.

Furthermore, invention provides a system for optimizing transmission of radio frequency communication link signals in a radio frequency communications network comprising means for determining a statistical difference between a mean radio frequency communication link propagation loss value based on a set of measured radio frequency communication link propagation loss values, and a radio frequency communication link propagation loss model value; means for calculating a signal to noise ratio of a radio frequency communication link signal; means for computing a confidence interval based on a measured signal to noise threshold ratio of a measured radio frequency communication link signal, and a standard deviation associated with the calculated signal to noise ratio; means for assigning a probability value based on the confidence interval; and means for generating a radio frequency communication link packet completion rate performance level based on the probability value. The transmission of radio frequency communication link signals occurs in situations in which there is either jamming or no jamming of the frequency communications network. Moreover, the radio frequency communication link signals are transmitted from a transmitter to a receiver in the radio frequency communications network.

Figure 3:
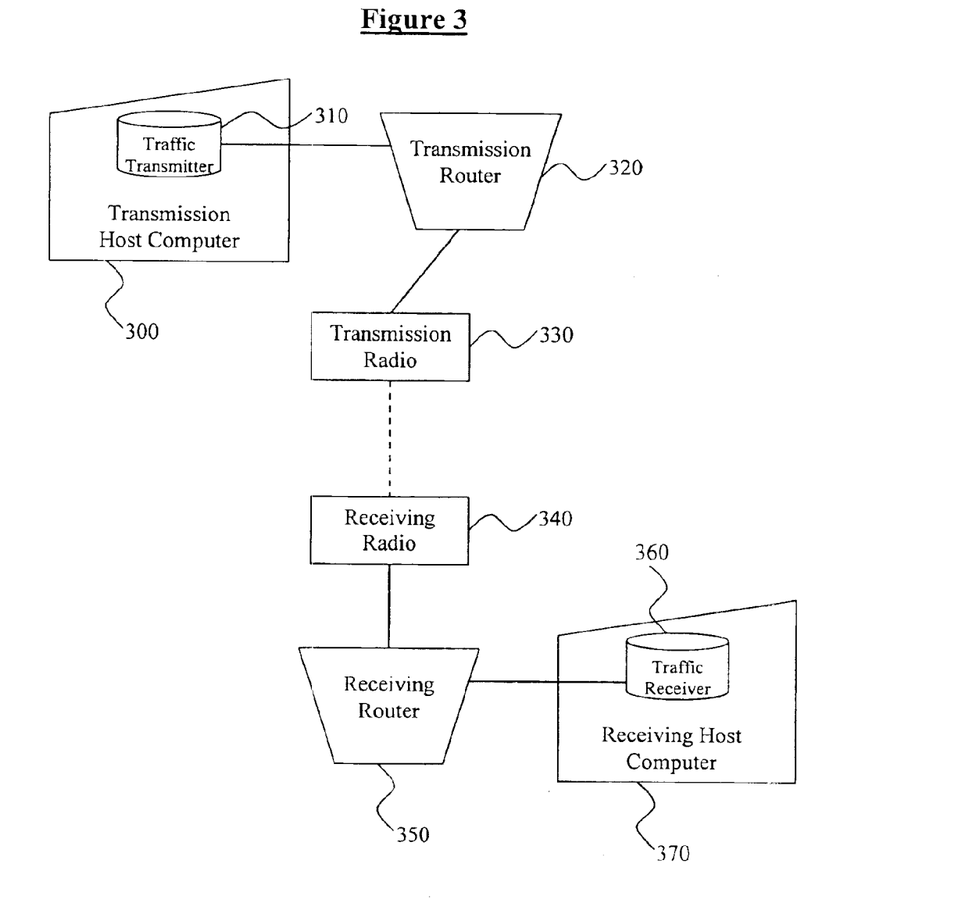
FIG. 3 is a system diagram according to the invention.

The system may incorporate computers, calculators, generators, transmitters, receivers, radios, comparators, and other data generation, consolidation, and calculation devices arranged to perform the functions described above. Furthermore, those skilled in the art will readily understand implementing such an arrangement to perform the functions described above. For example, a system as illustrated in FIG. 3 may be used, wherein a traffic transmitter 310 is used to send a host message from a transmission host computer 300 to a receiving host computer 370, wherein the host message is contained in one RF packet. The transmission host computer 300 is connected to a transmission router 320, which is then connected to a transmission radio 330 on the transmission side of the network. The receiving radio 340, which receives the host message from the transmission radio 330, is connected to a receiving router 350, which is then connected to a traffic receiver 360 in a receiving host computer 370.

According to the experiment conducted in implementing the invention, 100 messages were sent from the transmission host computer 300 and then counted on the receiving host computer 370. The threshold S/N for this sample problem was for a PCR of 80%. Again, the minimum required messages for the PCR experiment are determined by the trial size referenced in the Duncan text.

Figure 4:
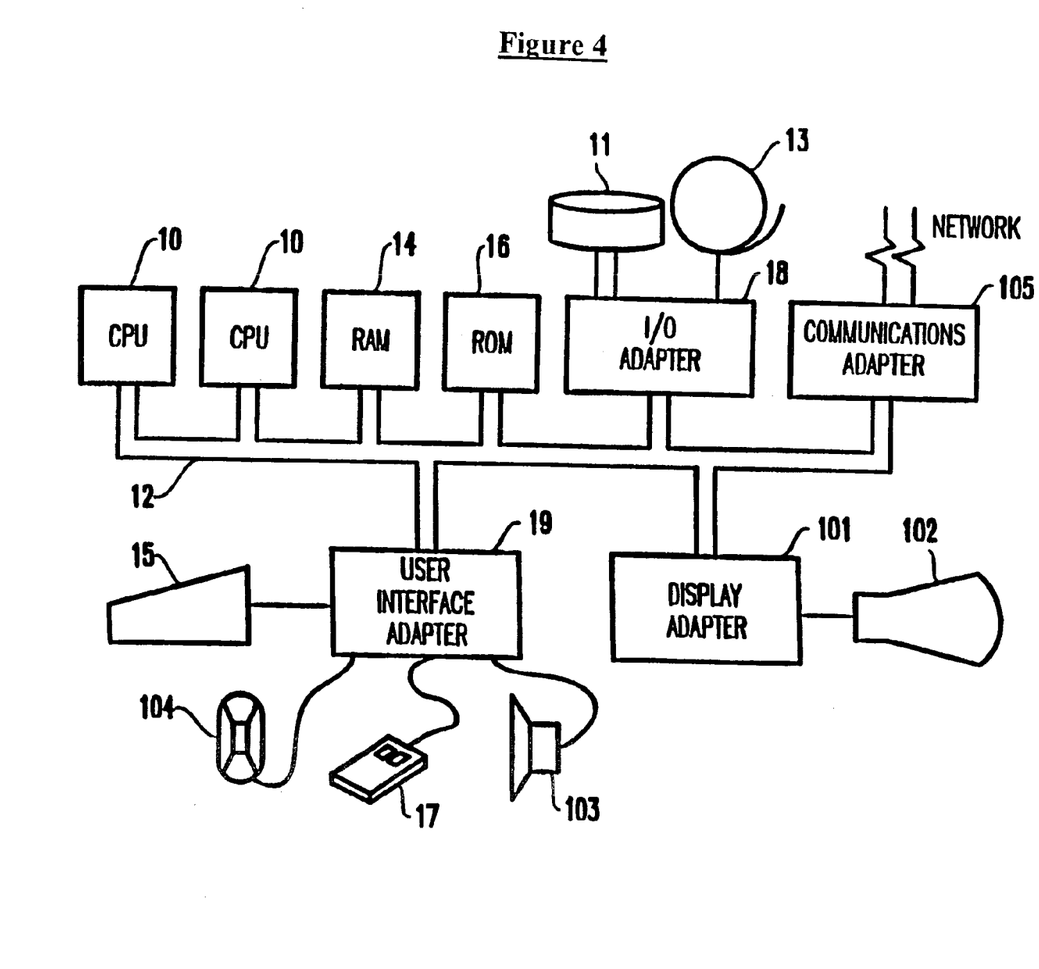
FIG. 4 is a system diagram according to the invention.

A representative hardware environment for practicing the present invention is depicted in FIG. 4, which illustrates a typical hardware configuration of an information handling/computer system in accordance with the present invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network, and display adapter 101 for connecting bus 12 to display device 102. A program storage device readable by the disk or tape units is used to load the instructions, which operate the invention, which is loaded onto the computer system.

The RFLPT process of the invention has several potential uses including providing the Commander, Army Field Tester, or commercial radio designer a predicted outcome of RF Packet Completion Rates (PCR) prior to deploying an RF network. The PCR rate is defined as the ratio of successfully received packets divided by the total packets sent from a source host computer over a single RF link to a destination host computer. The deployment used by a network is provided by the Commander or Tester and does not restrict the network to a specific deployment but provides useful information on the link PCR outcome, based on a preferred deployment with and without jamming of the communications network. Additionally, the process provided by the invention can be used with any RF propagation loss model, which has a predetermined standard deviation value for the calculated model propagation loss value and the measured propagation loss value.

The invention's RFLPT process can also be used to design a jamming field test based on the direction of the jammer's antenna and its power levels as determined by the RFLPT. Moreover, the S/N threshold value, which is determined by the inventive procedures, can be used to improve radio designs. Additionally, Connectivity Confidence Interval (CCI) values, determined for each possible RF link used by a network, can be used to simulate PCRS, which are used in conventional U.S. Army RF communication models. In fact, the RFLPT process of the invention provides the trial size and the probability value required to simulate PCRs. As mentioned, the conventional models use the Terrain-Integrated Rough-Earth Model to calculate a mean RF propagation loss value given a terrain profile along the RF link path. However, the S/N value calculated from the TIREM's nominal propagation loss value does not account for the standard deviation associated with the TIREM calculated propagation loss and actual measured values of propagation loss. Conversely, the Connectivity Confidence Interval of the invention does account for the standard deviation of each link.

Furthermore, there are several problems, which the RFLPT process of the invention solves. For example, the inventive RFLPT process may be used to support EPLRS field jamming tests and provide an accurate prediction of PCRs prior to the test. In fact, this was confirmed after conducting a test using the invention with actual data. Moreover, the laboratory-measured PCR test provides a new method of testing, which does not require separate Bit Error Rate measurements (BER), which are used in conventional approaches. The BER measurements are more difficult to determine with packet structure radios. Rather the BER of the invention is a function of the PCR. The PCR value provides the end user a parameter, which directly correlates with the host computer's Message Completion Rate. The PCRs are defined as a statistical probability, but because this probability is limited to two decimals it also becomes a percentage value.

Also, the CCI value determined from the inventive RFLPT process provides an accurate prediction of PCRs over current U.S. Army RF communication methods, which may predict an incorrect outcome, and the inventive RFLPT process provides a method for quantifying the effects of jamming and non-jamming environments on digital packets or message traffic. Moreover, the invention assists in identifying potential design faults and errors in the technical documentation for U.S. Army radios. These findings may also help to improve future designs of U.S. Army radios and other communication devices.

The PCR test procedures above were initially demonstrated on the EPLRS radio. These procedures have also been used to perform EW susceptibility tests on other communication systems such as the Single Channel Ground Air Radio System (SINCGARS), Near Term Digital Radio (NTDR) and the High Capacity Light of Sight (HCLOS) Radio.

There are several advantages of the RFLPT process provided by the invention. For example, the inventive PCR test procedures allow testing of EW susceptibility test procedures. Moreover, the invention reduces the cost of paying contractors to use their test facilities to test new jamming waveforms, which also affects their productivity during production because of new procedures required to test new waveforms. Another advantage of the invention is that it reduces costs in paying contractors to develop test plans and traffic generators for the test, as existing traffic generators and existing commands may be used instead on the host computer. Furthermore, the trial size used in the PCR as provided by the invention, for determining the threshold S/N value, reduces testing time and provides a realistic percentage number based on the tolerances of laboratory test equipment. Also, test time is reduced because the trial experiment is based on successfully received packets and not the time to receive packets. In fact, over-testing is costly and does not improve the accuracy of the PCR value. Moreover, by not having to conduct a BER test and reducing the total messages (100 minimum) used in the PCR experiment, the invention reduces time and costs associated with laboratory tests and experiments.

Other advantages of the invention are that it identifies potential design faults and errors in the technical documentation provided to the U.S. Army. These findings also help to improve future designs of U.S. Army radios and other communication devices. Generally, the inventive RFLPT methodology provides a process, which currently does not exist and is used to design field-jamming tests, which are costly, and time consuming, especially if the desired outcome is not achieved and retesting is involved.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for optimizing transmission of radio frequency communication link signals in a radio frequency communications network, said method comprising:
   (a) determining a statistical difference between:
      a mean radio frequency communication link propagation loss value based on a set of measured radio frequency communication link propagation loss values, and a radio frequency communication link propagation loss model value;
   (b) calculating a signal to noise ratio of a radio frequency communication link signal;
   (c) computing a confidence interval based on:
      a measured signal to noise threshold ratio of a measured radio frequency communication link signal, and
      a standard deviation associated with said calculated signal to noise ratio;
   (d) assigning a probability value based on said confidence interval; and
   (e) generating a radio frequency communication link packet completion rate performance level based on said probability value.

2. The method of claim 1, wherein said transmission of radio frequency communication link signals occurs in situations in which there is jamming of said frequency communications network.

3. The method of claim 1, wherein said transmission of radio frequency communication link signals occurs in situations in which there is no jamming of said frequency communications network.

4. The method of claim 1, wherein said radio frequency communication link propagation loss model value is based on a Terrain-Integrated Rough-Earth Model.

5. The method of claim 1, wherein said radio frequency communication link performance level comprises a probability of successfully receiving transmissions of digital packets in said radio frequency communications network.

6. The method of claim 5, wherein said probability of successfully receiving transmissions of digital packets in said radio frequency communications network comprises packet completion rate measurements.

7. The method of claim 1, wherein said radio frequency communication link signals are transmitted from a transmitter to a receiver in said radio frequency communications network.

8. The method of claim 7, wherein in said step of calculating a signal to noise ratio, a value of said signal comprises a combination of power of said transmitter, an antenna gain of said transmitter, a cable loss of said transmitter, a propagation loss value from said transmitter to said receiver, an antenna gain of said receiver, and a cable loss of said receiver.

9. The method of claim 7, wherein in said step of calculating a signal to noise ratio, a value of said noise comprises a combination of power of a jamming transmitter, an antenna gain of said jamming transmitter, a cable loss of said jamming transmitter, a propagation loss value from said jamming transmitter to said receiver, an antenna gain of said receiver, a cable loss of said receiver, and a jammer bandwidth correction factor.

10. A system for optimizing transmission of radio frequency communication link signals in a radio frequency communications network comprising:
   (a) means for determining a statistical difference between:
      a mean radio frequency communication link propagation loss value based on a set of measured radio frequency communication link propagation loss values, and
      a radio frequency communication link propagation loss model value;
   (b) means for calculating a signal to noise ratio of a radio frequency communication link signal;
   (c) means for computing a confidence interval based on:
      a measured signal to noise threshold ratio of a measured radio frequency communication link signal, and
      a standard deviation associated with said calculated signal to noise ratio;
   (d) means for assigning a probability value based on said confidence interval; and
   (e) means for generating a radio frequency communication link packet completion rate performance level based on said probability value.

11. The system of claim 10, wherein said transmission of radio frequency communication link signals occurs in situations in which there is jamming of said frequency communications network.

12. The system of claim 10, wherein said transmission of radio frequency communication link signals occurs in situations in which there is no jamming of said frequency communications network.

13. The system of claim 10, wherein said radio frequency communication link propagation loss model value is based on a Terrain-Integrated Rough-Earth Model.

14. The system of claim 10, wherein said radio frequency communication link performance level comprises a probability of successfully receiving transmissions of digital packets in said radio frequency communications network.

15. The system of claim 14, wherein said probability of successfully receiving transmissions of digital packets in said radio frequency communications network comprises packet completion rate measurements.

16. The system of claim 10, wherein said radio frequency communication link signals are transmitted from a transmitter to a receiver in said radio frequency communications network.

17. The system of claim 16, wherein in said signal to noise ratio, a value of said signal comprises a combination of power of said transmitter, an antenna gain of said transmitter, a cable loss of said transmitter, a propagation loss value from said transmitter to said receiver, an antenna gain of said receiver, and a cable loss of said receiver.

18. The system of claim 16, wherein in said signal to noise ratio, a value of said noise comprises a combination of power of a jamming transmitter, an antenna gain of said jamming transmitter, a cable loss of said jamming transmitter, a propagation loss value from said jamming transmitter to said receiver, an antenna gain of said receiver, a cable loss of said receiver, and a jammer bandwidth correction factor.

19. A program storage device readable by machine, tangibly embodying a program of instructions executable by said machine to perform a method for optimizing transmission of radio frequency communication link signals in a radio frequency communications network, said method comprising:

(a) determining a statistical difference between:
   a mean radio frequency communication link propagation loss value based on a set of measured radio frequency communication link propagation loss values, and
   a radio frequency communication link propagation loss model value;

(b) calculating a signal to noise ratio of a radio frequency communication link signal;

(c) computing a confidence interval based on:
   a measured signal to noise threshold ratio of a measured radio frequency communication link signal, and
   a standard deviation associated with said calculated signal to noise ratio;

(d) assigning a probability value based on said confidence interval; and (e) generating a radio frequency communication link packet completion rate performance level based on said probability value.

20. The program storage device of claim 19, wherein said transmission of radio frequency communication link signals occurs in situations in which there is jamming of said frequency communications network.

21. The program storage device of claim 19, wherein said transmission of radio frequency communication link signals occurs in situations in which there is no jamming of said frequency communications network.

22. The program storage device of claim 19, wherein said radio frequency communication link propagation loss model value is based on a Terrain-Integrated Rough-Earth Model.

23. The program storage device of claim 19, wherein said radio frequency communication link performance level comprises a probability of successfully receiving transmissions of digital packets in said radio frequency communications network.

24. The program storage device of claim 23, wherein said probability of successfully receiving transmissions of digital packets in said radio frequency communications network comprises packet completion rate measurements.

25. The program storage device of claim 19, wherein said radio frequency communication link signals are transmitted from a transmitter to a receiver in said radio frequency communications network.

26. The program storage device of claim 25, wherein in said step of calculating a signal to noise ratio, a value of said signal comprises a combination of power of said transmitter, an antenna gain of said transmitter, a cable loss of said transmitter, a propagation loss value from said transmitter to said receiver, an antenna gain of said receiver, and a cable loss of said receiver.

27. The program storage device of claim 25, wherein in said step of calculating a signal to noise ratio, a value of said noise comprises a combination of power of a jamming transmitter, an antenna gain of said jamming transmitter, a cable loss of said jamming transmitter, a propagation loss value from said jamming transmitter to said receiver, an antenna gain of said receiver, a cable loss of said receiver, and a jammer bandwidth correction factor.

* * * * *